(12) United States Patent
Lee et al.

(10) Patent No.: US 8,900,745 B2
(45) Date of Patent: Dec. 2, 2014

(54) POLYAMIDE PACKING SEAL FOR ALKALINE BATTERIES

(75) Inventors: Kwang-Sang Lee, Seoul (KR); Yeong Chool Yu, Seoul (KR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 13/641,409

(22) PCT Filed: Apr. 12, 2011

(86) PCT No.: PCT/EP2011/055678
§ 371 (c)(1),
(2), (4) Date: Dec. 19, 2012

(87) PCT Pub. No.: WO2011/128321
PCT Pub. Date: Oct. 20, 2011

(65) Prior Publication Data
US 2013/0200308 A1 Aug. 8, 2013

(30) Foreign Application Priority Data
Apr. 13, 2010 (FR) .................................. 10 01542

(51) Int. Cl.
*H01M 2/08* (2006.01)
*H01M 6/08* (2006.01)
*C09K 3/10* (2006.01)

(52) U.S. Cl.
CPC .............. *C09K 3/1006* (2013.01); *Y02E 60/12* (2013.01); *H01M 6/08* (2013.01); *H01M 2/08* (2013.01)
USPC ......................................... 429/174; 429/164

(58) Field of Classification Search
CPC ....... H01M 2/08; H01M 2/0413; H01M 6/08; C09K 3/1006; Y02E 60/12
USPC .................... 429/164, 174; 524/538; 525/432
See application file for complete search history.

(56) References Cited

U.S. PATENT DOCUMENTS

| | | | |
|---|---|---|---|
| 4,333,995 A | 6/1982 | Ishida et al. | |
| 5,837,398 A * | 11/1998 | Adams et al. | 429/174 |
| 6,794,082 B2 * | 9/2004 | Mori et al. | 429/174 |
| 7,285,334 B1 | 10/2007 | Yamashita et al. | |
| 2002/0127469 A1 * | 9/2002 | Mori et al. | 429/174 |
| 2004/0221446 A1 * | 11/2004 | Ohhara et al. | 29/623.5 |
| 2006/0222938 A1 | 10/2006 | Yoshioka et al. | |
| 2008/0051495 A1 * | 2/2008 | Murakami et al. | 524/100 |
| 2008/0152885 A1 * | 6/2008 | Miyoshi et al. | 428/220 |
| 2009/0087798 A1 | 4/2009 | Menon et al. | |
| 2009/0181295 A1 * | 7/2009 | Usami et al. | 429/145 |

FOREIGN PATENT DOCUMENTS

| | | |
|---|---|---|
| DE | 100 55 373 A1 | 5/2001 |
| WO | 2009/087798 A1 | 7/2009 |

OTHER PUBLICATIONS

International Search issued on Jul. 6, 2011, by the European Patent Office as the International Searching Authority in International Patent Application No. PCT/EP2011/055678.

* cited by examiner

*Primary Examiner* — Stewart Fraser
(74) *Attorney, Agent, or Firm* — Dentons US LLP

(57) ABSTRACT

Packing seals made from a polyamide composition including at least polyamide 66 and polyamide 610 for alkaline batteries, optionally fillers and/or additives are described. The packing seals can be used in particular for standard "AAA" (LR03) and "AA" (LR6) batteries.

11 Claims, No Drawings

POLYAMIDE PACKING SEAL FOR ALKALINE BATTERIES

CROSS-REFERENCE TO PRIOR APPLICATIONS

This application is a National Stage of PCT/EP2011/055678, filed Apr. 12, 2011, and designating the United States (published in French on Oct. 20, 2011, as WO 2011/128321 A1; the title and abstract were published in English), which claims priority to FR 10/01542, filed Apr. 13, 2010, each hereby expressly incorporated by reference in its entirety and each assigned to the assignee hereof.

The present invention relates to packing seals for alkaline batteries, made from a polyamide composition comprising at least polyamide 66 and polyamide 610; and optionally fillers and/or additives. These packing seals are especially suitable for alkaline batteries such as standard "AAA" (LR03) and "AA" (LR6) stick batteries.

An alkaline battery is a type of battery operating by redox between zinc (Zn) and manganese dioxide ($M_nO_2$), which takes its name from the fact that its two electrodes, named the positive pole and the negative pole, are immersed in an alkaline electrolyte of potassium hydroxide (KOH).

Alkaline batteries may be manufactured in the form of cylinders and buttons. A cylindrical battery is contained in a steel tube, which serves as a collector for the cathode current. This battery consists of a mixture of a compressed manganese dioxide paste supplemented with carbon powder to improve the conductivity. This paste may be poured into the tube or inserted in the form of preformed rings. The central hole of the cathode is coated with a separator which prevents the mixing of the products of the anode and of the cathode and the short-circuiting of the battery element. The anode consists of a dispersion of zinc powder in a gel containing the electrolyte of potassium hydroxide. In the batteries of standard stick type, the anode corresponds to the flat end, while the cathode is the end with a protruding stud.

Over time, alkaline batteries are liable to suffer leakage of the potassium hydroxide, which is a caustic substance that causes respiratory, ocular and cutaneous irritation, and leads to a reduction in the performance of the battery over time. Packing seals, also known as gaskets, thus exist, which make it possible to slow down or prevent the leakage of potassium hydroxide. These packing seals may be based on polyamide 66 as mentioned in patent application US 2006/0222938. These packing seals may also be composed of polyamide 612 or polyamide 610 as mentioned in patent application WO 2009/087798. However, it appears that these polyamide resins do not allow sufficient retention of and resistance to potassium hydroxide.

The Applicant has discovered, entirely surprisingly, that a mixture of polyamide 66 and polyamide 610 makes it possible to produce packing seals for alkaline batteries that are entirely satisfactory and that especially have good chemical resistance to potassium hydroxide, allowing a very substantial reduction in leakage, which is much more effective than with the other polyamide matrices conventionally used in the field.

A main subject of the present invention is thus a packing seal for alkaline batteries, made from a polyamide composition comprising at least polyamide 66 and polyamide 610; and optionally fillers and/or additives. The present invention also relates to the use of such a composition for reducing or preventing the leakage of potassium hydroxide from an alkaline battery.

The composition preferentially comprises from 30% to 70% by weight of polyamide 66 and from 30% to 70% by weight of polyamide 610; relative to the total weight of the composition.

Polyamides 66 and 610 are well described in the literature, especially in the Nylon Plastics Handbook by M. I. Kohan; Hanser, 1995. The term "polyamide 66" especially means a polyamide comprising at least 80% by mass of hexamethyleneadipamide units. The term "polyamide 610" especially means a polyamide comprising at least 80% by mass of hexamethylenesebacamide units. These polyamides may thus entirely be (co)polyamides. Polyamides 66 and 610 are generally hot-blended, especially by extrusion.

The composition according to the invention may also comprise additives conventionally used for the manufacture of polyamide compositions. Thus, mention may be made of lubricants, flame retardants, plasticizers, nucleating agents, impact modifiers, reinforcing or packing fillers, catalysts, light and/or heat stabilizers, antioxidants, antistatics, colorants, mattifying agents, molding aids or other conventional additives.

The reinforcing or packing fillers according to the present invention may be, for example, fibrous fillers and/or non-fibrous fillers.

Fibrous fillers that may be mentioned include glass fibers, carbon fibers, natural fibers, aramid fibers and nanotubes, especially carbon nanotubes. Hemp and flax may be mentioned as natural fibers. Among the non-fibrous fillers, mention may be made especially of any particulate or lamellar filler and/or exfoliable or non-exfoliable nanofiller, for instance alumina, carbon black, aluminosilicate clays, montmorillonites, zirconium phosphate, kaolin, calcium carbonate, diatomaceous earths, graphite, mica, silica, titanium dioxide, zeolites, talc, wollastonite, polymeric fillers, for instance dimethacrylate particles, glass beads or glass powder.

It is entirely possible according to the invention for the composition to comprise several types of reinforcing filler. Preferentially, the filler most commonly used may be glass fibers, of the chopped type, especially with a diameter of between 7 and 14 µm. These fillers may have a surface sizing that ensures mechanical adhesion between the fibers and the polyamide matrix.

The weight concentration of the reinforcing or packing fillers is advantageously between 1% and 60% and preferably between 15% and 50% by weight relative to the total weight of the composition.

It is especially possible to add impact-strength modifiers to the polyamide composition. Elastomeric polymers may generally be used for this purpose. Resilience modifiers are generally defined as having a tensile modulus ASTM D-638 of less than about 500 MPa. Examples of elastomers that are suitable for use are ethylene-acrylic ester-maleic anhydride, ethylene-propylene-maleic anhydride, ethylene-propylene-diene monomer (EPDM) optionally with a grafted maleic anhydride.

Impact modifiers comprising polyamide-reactive functional groups are especially preferred. Examples that may be mentioned include terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene/maleimide copolymers grafted with maleic anhydride, styrene/ethylene/butylene/styrene copolymers modified with maleic anhydride, styrene/acrylonitrile copolymers grafted with maleic anhydride, acrylonitrile/butadiene/styrene copolymers grafted with maleic anhydride, and hydrogenated versions thereof. The weight proportion of these agents in the total composition is especially between 0.1% and 40% and preferentially between 5% and 20%.

A composition that is especially preferred is one comprising:
- 30% to 70% by weight of polyamide 66;
- 30% to 70% by weight of polyamide 610;
- 0.1% to 40% by weight of impact-strength modifier; relative to the total weight of the composition.

These fillers and additives may be added to the polyamide composition via usual means suited to each filler or additive, for instance during the polymerization or mixed in the melt.

The compositions of the invention are generally obtained by hot-blending of the various constituents, for example in a single-screw or twin-screw extruder, at a temperature sufficient to keep the polyamide resin in molten medium; or by cold-blending especially in a mechanical mixer. Generally, the mixture obtained is extruded in the form of rods that are chopped into pieces to form granules. The compounds may be added at any moment in the process of manufacturing the plastic material, especially by hot- or cold-blending with the plastic matrix. The addition of the compounds and additives may be performed by adding these compounds to the molten plastic matrix in pure form or in the form of a concentrated mixture in a matrix, for instance a plastic matrix.

The composition is preferentially a molding composition, for example in the form of granules or powder, serving especially for the manufacture of articles, especially via a molding or injection-molding process. The composition according to the invention may be used for any process for forming plastic materials, for instance molding processes, especially injection-molding, rotomolding, sintering or casting, or extrusion processes such as blow extrusion and film extrusion, or alternatively spinning processes. The invention thus also relates to processes for manufacturing molded or extruded articles by the forming of a composition of the invention.

The packing seals of the invention may be used for various types of alkaline battery, especially button or cylindrical batteries. The stick-type standard batteries "AAA" (LR03), "AA" (LR6), "C" (LR14), "sub-C" and "D" are especially preferred. The format of electrical batteries is standardized by the Commission Electrotechnique Internationale (CEI) and by the American National Standards Institute (ANSI). These batteries may be rechargeable or non-rechargeable.

The present invention also relates to an alkaline battery comprising electricity-generating elements and a packing seal according to the present invention.

The present invention also relates to a process for manufacturing packing seals by molding a composition according to the invention.

Specific terms are used in the description so as to facilitate understanding of the principle of the invention. Nevertheless, it should be understood that no limitation of the scope of the invention is envisioned by the use of these specific terms. Modifications, improvements and perfections may especially be envisioned by a person skilled in the technical field concerned, on the basis of his general knowledge. The term "and/or" includes the meanings "and", "or" and all the other possible combinations of the elements connected to this term. Other details or advantages of the invention will emerge more clearly in the light of the examples below, given solely by way of indication.

EXPERIMENTAL SECTION

The compositions of Examples 1 and 2 and of Comparative Examples C1 and C2 are prepared and tested as mentioned below:

The compounds used are as follows:
- A-1: polyamide 66 Technyl 26A, manufactured by Rhodia, with a relative viscosity of 2.6 (measured with 1% by weight of sulfuric acid at 23° C.) and a melting point of 262° C.
- A-2: polyamide 610 with a relative viscosity of 2.8 (measured with 1% by weight of sulfuric acid at 23° C.) and a melting point of 218° C.
- B: ethylene-propylene elastomer grafted with maleic anhydride, sold under the trade name Kepa 1150 by Keumho Petrochemical, Korea
- C: talc (#600 mesh)
- D: additives comprising antioxidants and lubricants The compositions are manufactured by mixing the compounds in a twin-screw extruder (inside diameter 30 mm; L/D=30). The temperature profile of the extruder is between 260 and 280° C. The extrusion rate is between 250 and 300 rpm under a vacuum of 50-70 cmHg.

The granules obtained, after drying, are formed in an Engel injection press with a compression force of 80 tonnes and an injection volume of 189.44 cc. The cylinder temperature is 280° C. and the mold temperature is 80° C. The injection and cooling cycle is about 15 seconds. Various specimens were made, according to the tests to be performed. Packing seals were also made and assembled with LR6 alkaline batteries for KOH leakage tests.

The formulations are tested and the results are given in Table 1 below:

TABLE 1

|  | Method | Unit | C1 | C2 | 1 | 2 |
|---|---|---|---|---|---|---|
| A-1 |  | % | 97.8 | 86.8 | 48.9 | 43.4 |
| A-2 |  | % | 0 | 0 | 48.9 | 43.4 |
| B |  | % | 0 | 11 | 0 | 11 |
| C |  | % | 0.2 | 0.2 | 0.2 | 0.2 |
| D |  | % | 2 | 2 | 2 | 2 |
| Tensile strength | D638 | Kgf/cm² | nm | nm | nm | 600 |
| Elongation at break | D638 | % | nm | nm | nm | 39 |
| Flexural strength | D790 | Kgf/cm² | nm | nm | nm | 810 |
| Izod impact | D256 | Kgf · cm/cm | nm | nm | nm | 19 |
| HDT | D648 | ° C. | nm | nm | nm | 66 |
| Bleaching |  |  | 6 | 0 | 4 | 0 |
| KOH leakage: |  |  |  |  |  |  |
| after 1 week |  |  | 16 | 0 | 0 | 0 |
| 2 weeks |  |  | 19 | 0 | 0 | 0 |
| 3 weeks |  |  | 10 | 0 | 0 | 0 |
| 4 weeks |  |  | 5 | 7 | 0 | 0 |
| 5 weeks |  |  | — | 7 | 1 | 0 |
| 6 weeks |  |  | — | 10 | 4 | 0 |
| 7 weeks |  |  | — | 0 | 3 | 0 |
| 8 weeks |  |  | — | 3 | 4 | 0 |
| 9 weeks |  |  | — | 4 | 5 | 0 |
| 10 weeks |  |  | — | 19 | 8 | 0 | nm = not measured

The HDT is measured according to standard ASTM D-648 (18.5 kgf/cm²).

The bleaching is observed visually relative to 32 packing seals.

The KOH leakage is observed on 50 LR6 alkaline batteries containing 40% of KOH electrolytes placed for 10 weeks at 71° C. At the end of each week, the number of batteries on which leakage is noted is observed visually.

It is thus seen in Table 1 that the formulations of Examples 1 and 2 have much better chemical resistance to KOH than the formulations of the prior art.

The invention claimed is:

1. A packing seal for alkaline batteries, the packing seal comprising a polyamide composition comprising a mixture of polyamide 66 and polyamide 610, wherein the mixture comprises at least 30% by weight of polyamide 66 and at least 30% by weight of polyamide 610.

2. The packing seal as described by claim 1, wherein the composition comprises from 30% to 70% by weight of polyamide 66 relative to the total weight of the composition.

3. The packing seal as described by claim 1, wherein the composition comprises from 30% to 70% by weight of polyamide 610 relative to the total weight of the composition.

4. The packing seal as described by claim 1, wherein the composition comprises an additive selected from the group consisting of a lubricant, a flame retardant, a plasticizer, a nucleating agent, an impact modifier, a reinforcing filler, a packing filler, a catalyst, a light stabilizer, a heat stabilizer, an antioxidant, an antistatic, a colorant, a mattifying agent and a molding aid.

5. The packing seal as described by claim 1, wherein the composition comprises an impact-strength modifier.

6. The packing seal as described by claim 1, wherein the composition comprises:

30% to 70% by weight of polyamide 66;

30% to 70% by weight of polyamide 610; and 0.1% to 40% by weight of impact-strength modifier; relative to the total weight of the composition.

7. An alkaline battery comprising electricity-generating elements and a packing seal as described by claim 1.

8. A process for manufacturing packing seals, the process comprising molding a composition as described by claim 1.

9. A method of reducing leakage of potassium hydroxide from an alkaline battery, the method comprising preventing the leakage with a composition as described by claim 1.

10. The packing seal described by claim 1, wherein the polyamide composition comprises a filler and/or an additive.

11. The packing seal described by claim 1, wherein the mixture provides better chemical resistance to potassium hydroxide compared to a packing seal formulation that does not comprise a mixture of polyamide 66 and polyamide 610.

* * * * *